United States Patent [19]

Kaye

[11] 4,057,878
[45] Nov. 15, 1977

[54] WIRE CONNECTOR

[75] Inventor: Sidney P. Kaye, Delta, Canada

[73] Assignee: Tree Island Steel Co. Ltd., New Westminster, Canada

[21] Appl. No.: 722,804

[22] Filed: Sept. 13, 1976

[30] Foreign Application Priority Data

Sept. 17, 1975 United Kingdom ............ 38213/75

[51] Int. Cl.² .................. F16G 11/04; B25G 3/20
[52] U.S. Cl. .................. 24/134 R; 403/374;
339/274; 16/168; 24/134 R
[58] Field of Search .......... 24/134 QA, 134 P, 134 Q;
403/374; 339/274; 16/DIG. 13, 33, 168

[56] References Cited

U.S. PATENT DOCUMENTS 2,292,746  8/1942  Donald ............... 24/134 QA
3,855,669  12/1974  Meyer ............... 24/16 PB Primary Examiner—Bernard A. Gelak
Attorney, Agent, or Firm—Carver and Company

[57] ABSTRACT

A wire connector wherein wires to be connected are threaded into a sleeve from opposite ends thereof. A jamming cam is mounted on a resilient pin inside the sleeve which, when tension is applied to the wires to withdraw them from the sleeve, rotates into jamming engagement with the wires.

4 Claims, 5 Drawing Figures

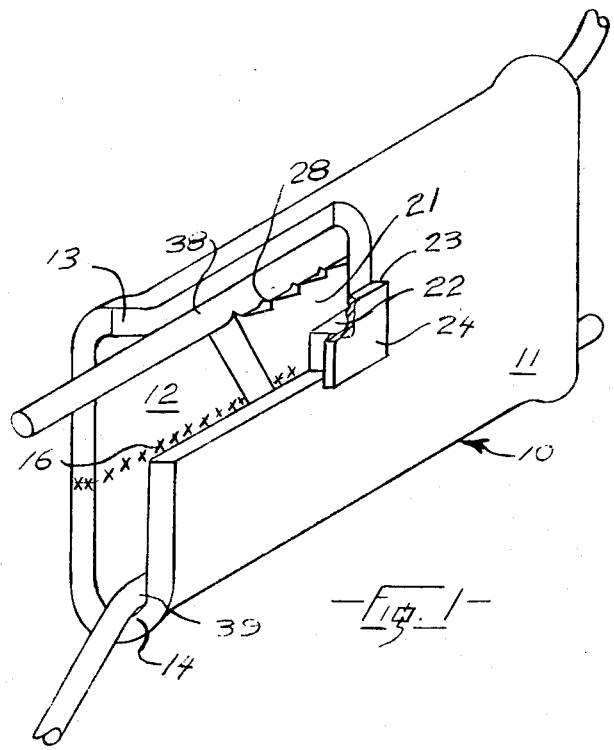
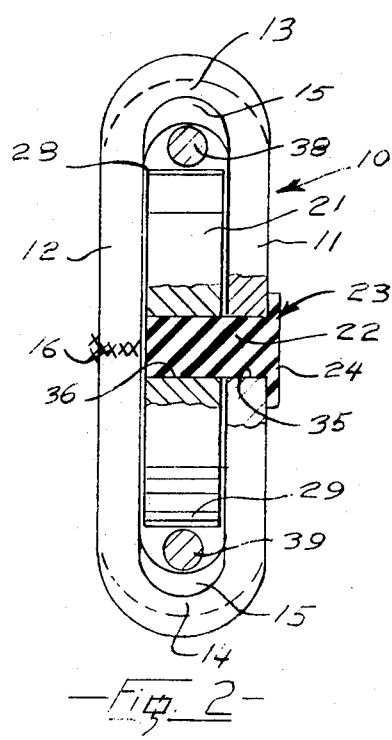

WIRE CONNECTOR

BACKGROUND OF THE INVENTION

1. Field of the Invention

This invention relates to connectors for connecting wire binding.

2. Prior Art

Prior art connectors for wire binding or ribbon strapping have generally been of a type which include a sleeve into which wire ends are threaded and then by the use of a special tool the sleeve is then crimped down against the wire so as to frictionally grip the latter. Although this type of connector is generally adequate for connecting small gauge wire when loads are not high, a special crimping tool is required. This type of connector is, however, not essentially suitable where spreading loads are high and thus where heavy gauge wire and thick ribbons must be used, as crimping tools required to obtain sufficient frictional grip are awkward to use and difficult to transport.

Further grip on the wire binding by this type of connector is at its highest when the wire is under zero load. As the wire is loaded and thus stretches, there is a slight reduction in wire diameter with a consequent reduction in frictional grip.

SUMMARY OF THE INVENTION

The present invention provides a connector for wire binding which is easy to apply and which does not require any tools for attachment.

The connector of the present invention, furthermore, is so constructed that grip on the wire increases as the load increases.

The connector of the present invention includes a sleeve having a generally thin rectangular section within which a double-ended jamming cam is mounted on an elastic pin extending through one wall of the sleeve. The jamming cam is toothed at each end and, normally, with the pin in a state of repose, takes a position in which the toothed ends engage wire ends slidably inserted into the sleeve, from opposite ends thereof. The jamming cam automatically rotates into a jamming position so as to grip the wires when tension is applied to the latter.

A detailed description following, related to drawings, give exemplification of apparatus according to the invention which, however, is capable of expression in means other than those particularly described and illustrated.

DESCRIPTION OF THE DRAWINGS

FIG. 1 is a perspective view of the connector with portions broken away,

FIG. 2 is an end view of the connector, with portions broken away,

DETAILED DESCRIPTION

Figure 3:
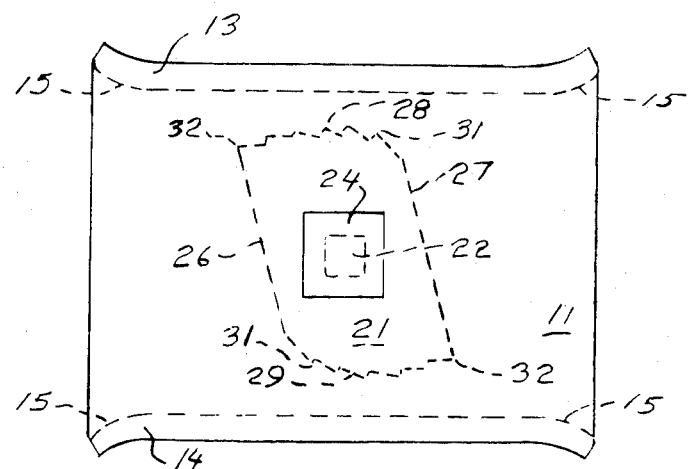
FIG. 3 is an elevation of the connector showing relationship of the parts with the jamming cam in a state of repose.

Referring to the drawings, and in particular to FIGS. 1 and 2, the connector includes a metallic sleeve 10 which has a flattened, generally elongated, rectangular section having planar side walls 11 and 12 and arcuate edge walls 13 and 14. Ends of the sleeve are flaired slightly to provide curved entrance portions, severally 15. The sleeve is preferably formed of sheet steel stock which is suitably formed and edges of the stock welded along line 16 of the side wall 12.

A double-ended jamming cam 21 is mounted in and centrally of the sleeve on the shank 22 of an elastic pin 23. The pin 23, which has a head 24, can suitably be made of rubber or a suitable elastic thermoplastic. The jamming cam, see also FIGS. 3, 4 and 5, has parallel spaced sides 26 and 27 and curved ends 28 and 29. The curved ends are toothed with tooth angle increasing incrementally from a narrow lead tooth 31 which has a tooth angle of approximately 60°, to a broad trailing tooth 32 which has a tooth angle of approximately 120°. Radius of curvature of the cam ends is such that the distance of the teeth measured to the geometric center of the cam increases incrementally from the lead tooth to the trailing tooth.

The shank 22 of the pin has a square cross-section and has a tight fit through an opening 35 of square cross-section through the side wall 11, at the geometric center thereof, and has a tight fit in an opening 36 also of square cross-section extending through and at the geometric center of the jamming cam. The pin can also be bonded by an adhesive, to the cam. The angular relationship of the opening 36 in the cam relative to toothed ends thereof is such that with the pin in a state of repose as shown in FIG. 3, the cam assumes a normal position in which the lead teeth confront the end walls 13 and 14 of the sleeve. Length of the cam is such that with the cam in a state of repose the lead teeth are spaced from the end walls of the sleeve a distance slightly less than the diameter of the wires to be connected.

Figure 4:
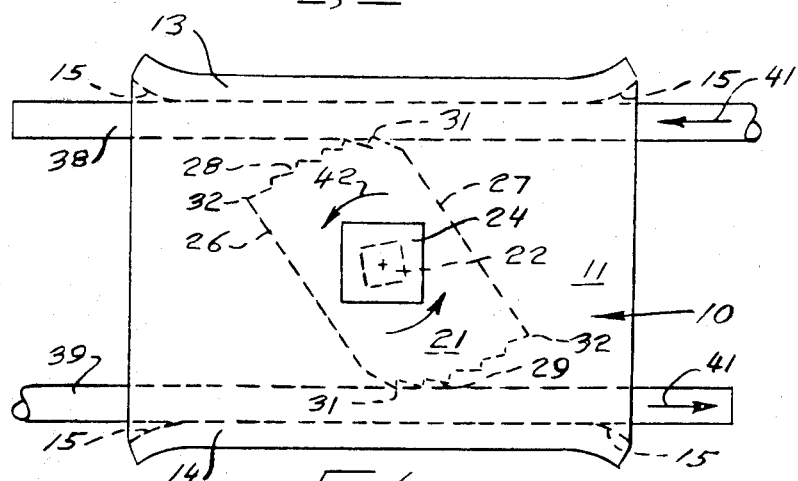
FIG. 4 is a view of the connector showing the jamming cam in an initially engaged position.
Figure 5:
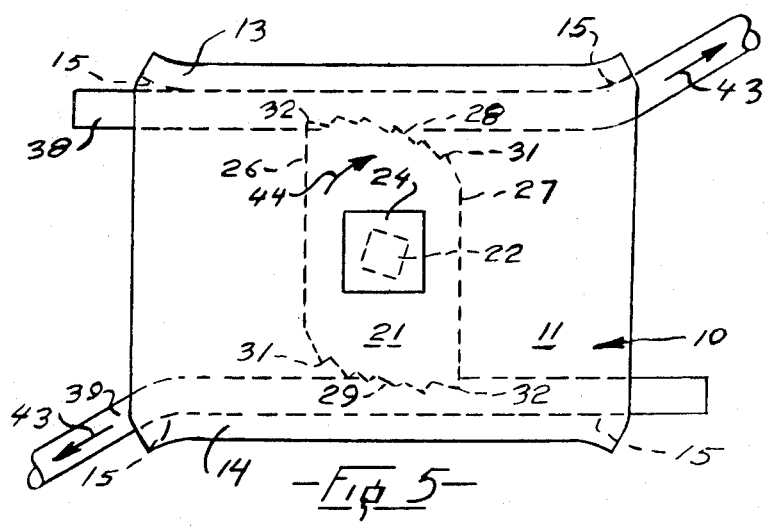
FIG. 5 is a view similar to FIGS. 3 and 4 showing the cam in a jamming position.

Use of the connector for connecting end portions 38 and 39 of a length of wire is shown in FIGS. 3, 4 and 5. In FIG. 3, as above explained, the cam is in a state of repose with the lead teeth spaced from the edge walls a distance slightly less than wire diameter. When the end portions 38 and 39 of the wire are shoved in opposite directions, shown by arrows 41, into the sleeve adjacent the edge walls thereof, the cam in the direction shown by arrow 42 sufficiently to enable the end portions of the wire to pass thereby. As the cam is non-rotatably mounted on the pin, the shank of the pin is consequently twisted from its state of repose position, and tendency of the shank to resume its state of repose position resiliently maintains the lead teeth of the cam against the wire ends. When tension is applied to the wires in direction shown by arrows 43, the friction or biting engagement of the narrow lead teeth on the wires results in rotation of the cam in a direction shown by the arrow 44 to bring the broad trailing teeth into engagement with the wire end portions so that the latter are jammed between the edge walls 13 and 14 and the ends of the cam thus preventing withdrawal of the wire from the sleeve.

It is evident that increase in the tension of the wire results in a corresponding increase in the jamming effect of the cam. Furthermore, due to the elasticity of the pin the cam can shift slightly transversely of the sleeve so that the cam automatically self-centers itself between the wire ends so that jamming pressure on both wire ends is equal.

Release of the connector and the wire can be effected by simply inserting a tool such as a screw driver, into one end of the sleeve against one end of the cam and the cam then backed off enough to provide sufficient clearance to enable the wire ends to be withdrawn from the sleeve.

Reference has been made to the use of the wire connector for joining of wires, however, it is to be understood that the term "wire" shall include other types of metalic tension members, for example metalic stranded cable, metalic strapping, chains and the like, consequently, the claims hereinafter appended shall be read accordingly.

I claim:

1. A wire connector for connecting a pair of wires comprising:
   a. an elongated sleeve open at each end for slidably receiving wires to be connected, said sleeve having substantially parallel opposite edge walls for seating the wires to be connected,
   b. an elastic pin disposed transversely within the sleeve intermediately between said side edges and being non-rotatably secured at least at one end to the sleeve,
   c. a double-ended jamming cam non-rotatably mounted on the pin yieldably maintained by the pin in frictional engagement with the wires so as to, automatically, rotate into jamming engagement with the wires when tension is applied to the wires to withdraw them from the sleeve.

2. A wire connector as claimed in claim 1 in which the ends of the jamming cam are serrated to provide a plurality of teeth, and in which the tooth angle of the teeth increases incrementally from a narrow lead tooth having an angle of approximately 60° to a broad trailing tooth having a tooth angle of approximately 20°.

3. A wire connector as claimed in claim 1 in which the ends of the sleeve at the edge wall thereof are flaired.

4. A wire connector as claimed in claim 1 in which the pin has a substantially rectangular transverse cross-section and in which the sleeve and the jamming cam have openings of substantially rectangular cross-section within which the pin has a tight non-rotatable fit.

* * * * *